US012793206B2

(12) United States Patent
Zhang et al.

(10) Patent No.: US 12,793,206 B2
(45) Date of Patent: Nov. 10, 2026

(54) FAULT DETECTION METHOD AND DEVICE FOR DISPLAY SCREEN, AND INSPECTION ROBOT

(71) Applicant: BOE Technology Group Co., Ltd., Beijing (CN)

(72) Inventors: Rongzuo Zhang, Beijing (CN); Yang Song, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 238 days.

(21) Appl. No.: 18/702,285

(22) PCT Filed: Apr. 27, 2023

(86) PCT No.: PCT/CN2023/091390
§ 371 (c)(1),
(2) Date: Apr. 17, 2024

(87) PCT Pub. No.: WO2024/001495
PCT Pub. Date: Jan. 4, 2024

(65) Prior Publication Data

US 2025/0014170 A1 Jan. 9, 2025

(30) Foreign Application Priority Data

Jun. 29, 2022 (CN) ......................... 202210759256.5

(51) Int. Cl.
*G06T 7/00* (2017.01)
*G06T 7/73* (2017.01)
*G06T 7/90* (2017.01)

(52) U.S. Cl.
CPC ................ *G06T 7/001* (2013.01); *G06T 7/74* (2017.01); *G06T 7/90* (2017.01); *G06T 2207/10024* (2013.01); *G06T 2207/30148* (2013.01)

(58) Field of Classification Search
CPC .. G06T 7/001; G06T 7/74; G06T 7/90; G06T 2207/10024; G06T 2207/30148
See application file for complete search history.

(56) References Cited

U.S. PATENT DOCUMENTS 10,867,382 B2 * 12/2020 Moertelmaier .... G01N 21/8851

FOREIGN PATENT DOCUMENTS

CN 101656031 A 2/2010
CN 102081895 A * 6/2011
(Continued)

OTHER PUBLICATIONS

2026.*
CN 202210759256.5 first office action dated Jan. 20, 2025.

*Primary Examiner* — Pinalben Patel
(74) *Attorney, Agent, or Firm* — IPro, PLLC

(57) ABSTRACT

Disclosed in embodiments of the present invention are a fault detection method and device for a display screen, and an inspection robot. The method includes: obtaining an image to be detected, wherein the image is obtained by photographing a tiled display screen by an inspection device in a moving process, the image is a display image of any display screen in the tiled display screen, the display screen includes a plurality of LED lamp beads, and each LED lamp bead corresponds to one imaging point; on the basis of a preset coordinate system, determining a coordinate set to be detected formed by imaging coordinates of imaging points having the same RGB value in the image; and respectively comparing the coordinate set to be detected with at least one preset fault point coordinate set, and if the comparison is successful, determining a fault type of the display screen.

12 Claims, 7 Drawing Sheets

(56) References Cited

FOREIGN PATENT DOCUMENTS

| | | | | | |
|---|---|---|---|---|---|
| CN | 104240324 | A | | 12/2014 | |
| CN | 106895791 | A | | 6/2017 | |
| CN | 107749055 | A | | 3/2018 | |
| CN | 108650503 | A | | 10/2018 | |
| CN | 109765245 | A | | 5/2019 | |
| CN | 210807487 | U | | 6/2020 | |
| CN | 111604888 | A | | 9/2020 | |
| CN | 112004010 | A | | 11/2020 | |
| CN | 112666178 | A | | 4/2021 | |
| CN | 112711963 | A | | 4/2021 | |
| CN | 113496477 | A | | 10/2021 | |
| CN | 114279683 | A | * | 4/2022 | |
| CN | 115018815 | A | | 9/2022 | |
| CN | 115546141 | A | * | 12/2022 | ............. G06V 10/44 |
| JP | 2020003343 | A | | 1/2020 | |

* cited by examiner

FAULT DETECTION METHOD AND DEVICE FOR DISPLAY SCREEN, AND INSPECTION ROBOT

CROSS-REFERENCE TO RELATED APPLICATIONS

The present application is a US National Stage of International Application No. PCT/CN2023/091390, filed on Apr. 27, 2023, which claims the priority to the Chinese patent application No. 202210759256.5 filed to the China National Intellectual Property Administration on Jun. 29, 2022, and entitled "Fault Detection Method and Device for Display Screen, and Inspection Robot", of which the entire contents are incorporated herein by reference.

TECHNICAL FIELD

The present disclosure relates to the technical field of display, in particular to a fault detection method and device for a display screen, and an inspection robot.

BACKGROUND

With the development of technologies, the application of a display system is becoming more and more widespread, and a display area is also getting larger. A large ground display light-emitting diode (LED) generally includes thousands of LED screens. In order to ensure normal display, regular inspection is needed to find out faults and handle them in a timely manner. The increasing display area has made it increasingly difficult to inspect the screen, putting enormous pressure on the troubleshooting of ground display.

In the related art, it is usually visual inspection or bird's-eye view through a telescope by an inspector. However, personnel detection is high in labor intensity and difficult to coordinate; and the bird's-eye view may not reveal most of the issues. Detection efficiency and accuracy of both are relatively low.

SUMMARY

Embodiments of the present disclosure provide a fault detection method and device for a display screen, and an inspection robot, to achieve automatic detection of the display screen, and improve detection efficiency and accuracy.

In a first aspect, an embodiment of the present disclosure provides a fault detection method for a display screen, including:

- acquiring a to-be-detected image, wherein the to-be-detected image is obtained by photographing a tiled display screen by an inspection device in a moving process, the to-be-detected image is a display image of any display screen in the tiled display screen, the display screen includes a plurality of LED lamp beads, and each LED lamp bead corresponds to one imaging point;
- determining, on the basis of a preset coordinate system, a to-be-detected coordinate set formed by imaging coordinates of imaging points having the same RGB value in the to-be-detected image; and
- respectively comparing the to-be-detected coordinate set with at least one preset fault point coordinate set, and determining a fault type of the display screen if the comparison is successful, wherein a fault type of a display screen corresponds to at least one preset fault point coordinate set.

In a second aspect, an embodiment of the present disclosure provides an inspection device for fault detection of a display screen, applied to the method described in the first aspect, and including an inspection robot, a frame, a light-shading part and image acquisition equipment, wherein

- a bottom of the frame is provided with wheels for controlling the inspection device to move;
- the image acquisition equipment is located in a space formed by the frame and the light-shading part, is arranged on the inspection robot, faces one side of a tiled display screen, and is used for photographing the tiled display screen to obtain a to-be-detected image, wherein the to-be-detected image is a display image of any display screen in the tiled display screen; and
- the inspection robot receives the to-be-detected image from the image acquisition equipment and determines whether the display screen is faulty and a fault type according to the to-be-detected image.

In a third aspect, an embodiment of the present disclosure provides a fault detection device for a display screen, including:

- an image acquiring module, configured to acquire a to-be-detected image, wherein the to-be-detected image is obtained by photographing a tiled display screen by an inspection device in a moving process, the to-be-detected image is a display image of any display screen in the tiled display screen, the display screen includes a plurality of LED lamp beads, and each LED lamp bead corresponds to one imaging point;
- a coordinate determining module, configured to determine, on the basis of a preset coordinate system, a to-be-detected coordinate set formed by imaging coordinates of imaging points having the same RGB value in the to-be-detected image; and
- a fault determining module, configured to respectively compare the to-be-detected coordinate set with at least one preset fault point coordinate set, and determine a fault type of the display screen if the comparison is successful, wherein a fault type of a display screen corresponds to at least one preset fault point coordinate set.

In a fourth aspect, an embodiment of the present disclosure provides an inspection robot, including a memory, a processor, and computer programs stored on the memory and capable of being run on the processor, wherein the processor, when executing the computer programs, implements steps of any method above.

In a fifth aspect, an embodiment of the present disclosure provides a computer readable storage medium, storing computer program instructions thereon, wherein the computer program instructions, when executed by a processor, implements steps of any method above.

The embodiments of the present disclosure have the following beneficial effects:

- the to-be-detected image (the display image of any display screen in the tiled display screen) obtained by photographing the tiled display screen by the inspection device in the moving process is acquired, the display screen includes the plurality of LED lamp beads, and each LED lamp bead corresponds to one imaging point. On the basis of the preset coordinate system, the to-be-detected coordinate set formed by the imaging coordinates of the imaging points having the same RGB value in the to-be-detected image is determined.

It can be known in combination with circuit characteristics of the display screen that the fault type of the display screen corresponds to the at least one preset fault point coordinate set, and the coordinates in the preset fault point coordinate set represent a location relationship between fault points under the corresponding fault type. Therefore, the to-be-detected coordinate set is respectively compared with the at least one preset fault point coordinate set, and the fault type of the display screen is determined if the comparison is successful. Compared with manual inspection, automatic detection of the display screen is achieved, and detection efficiency and accuracy are improved.

BRIEF DESCRIPTION OF FIGURES

In order to illustrate technical solutions of the embodiments of the present disclosure more clearly, accompanying drawings needing to be used in the embodiments of the present disclosure will be introduced below briefly. Apparently, the accompanying drawings introduced below are only some embodiments of the present disclosure, and those skilled in the art can further obtain other accompanying drawings according to these accompanying drawings without inventive efforts.

DETAILED DESCRIPTION

Figure 1:
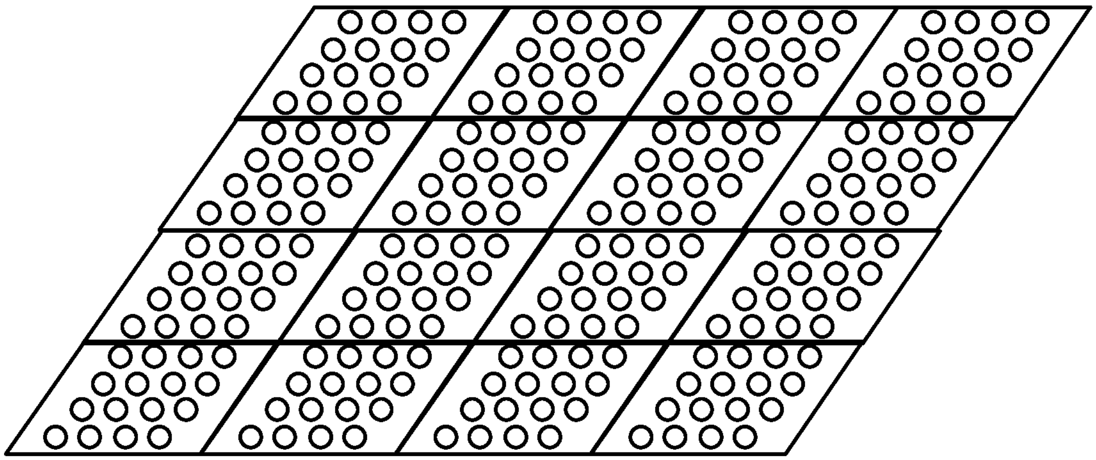
FIG. 1 is a schematic diagram of an application scenario of a fault detection method for a display screen provided by an embodiment of the present disclosure.

In order to make objectives, technical solutions and advantages of embodiments of the present disclosure clearer, the technical solutions in the embodiments of the present disclosure will be described below clearly and completely with reference to accompanying drawings in the embodiments of the present disclosure.

For the convenience of understanding, terms involved in the embodiments of the present disclosure will be explained below.

(1) LED is a commonly used light-emitting device that emits light through electrons and holes which are compounded to release energy.

Any quantity of elements in the accompanying drawings is used as an example rather than a limitation, and any naming is only for differentiation and does not have any restrictive meaning.

In a specific practice process, a large ground display LED generally includes thousands of LED display screens, and in order to ensure normal display, regular inspection is required to find out faults and handle them in a timely manner. The increasing display area has made it increasingly difficult to inspect the screen, putting enormous pressure on the troubleshooting of ground display.

In the related art, it is usually visual inspection or bird's-eye view through a telescope by an inspector. However, personnel visual inspection is high in labor intensity, and frequent check cannot be achieved. The personnel on the screen are complex, and coordination is difficult. For example, during screen use, inspection cannot be performed simultaneously. Personnel detection is limited by time, and visual inspection is severely affected by sunlight interference. The personnel are unable to get close to the screen for checking, and a kneeling position or a sitting position will significantly increase the labor intensity. A bird's-eye view cannot detect most of the issues, and only a rough display effect can be guaranteed. Overall, detection efficiency and accuracy of both are relatively low.

Therefore, the present disclosure provides a fault detection method for a display screen. In this method, an inspection device photographs a tiled display screen in a moving process, and obtains a display image of any display screen in the tiled display screen as a to-be-detected image, each display screen includes a plurality of lamp beads, and each LED lamp bead corresponds to one imaging point. Thus, after acquiring the to-be-detected image, a to-be-detected coordinate set formed by imaging coordinates of imaging points having the same RGB value in the to-be-detected image is determined. Because a fault type of a display screen corresponds to at least one preset fault point coordinate set, the to-be-detected coordinate set is respectively compared with the at least one preset fault point coordinate set, and the fault type of the display screen is determined if the comparison is successful. Automatic detection of the display screen is achieved, and detection efficiency and accuracy are improved.

After introducing the design concept of the embodiments of the present disclosure, the following is a brief introduction to application scenarios to which the technical solutions of the embodiments of the present disclosure can be applied. It should be noted that the application scenarios introduced below are only intended to illustrate the embodiments of the present disclosure, rather than limiting the same. In specific implementation, the technical solutions provided by the embodiments of the present disclosure may be flexibly applied according to actual needs.

Referring to FIG. 1, FIG. 1 is a schematic diagram of an application scenario of a fault detection method for a display screen provided by an embodiment of the present disclosure. Due to the fact that a large ground display LED generally includes thousands of LED display screens, and each display screen includes a plurality of LED lamp beads, a fault may be that a certain display screen is broken, or that one or several LED lamp beads in a display screen are faulty. The quantity and location indication of the display screen and the LED lamp beads in FIG. 1 are for illustration purposes and do not form specific limitations.

Of course, the method provided by the embodiment of the present disclosure is not limited to the application scenario shown in FIG. 1, and may further be used in other possible application scenarios, which is not limited in the embodiment of the present disclosure. Functions that can be achieved by each piece of equipment in the application scenario shown in FIG. 1 will be described together in the subsequent method embodiment, and will not be further repeated here.

To further illustrate the technical solutions provided by the embodiment of the present disclosure, a detailed explanation will be provided below with reference to the accompanying drawings and specific implementations. Although the embodiment of the present disclosure provides operation steps of the method as shown in the following embodiments or accompanying drawings, more or fewer operation steps may be included in the method based on conventional or non-creative effort. In steps where there is no necessary causal relationship logically, the execution order of these steps is not limited to the execution order provided by the embodiment of the present disclosure.

The technical solutions provided by the embodiment of the present disclosure are illustrated below in combination with the application scenario shown in FIG. 1.

Figure 2:
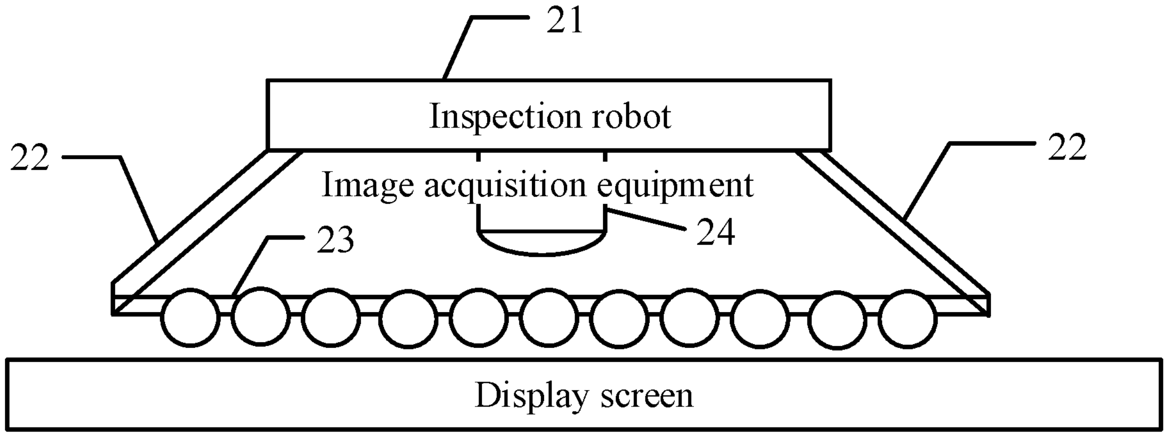
FIG. 2 is a schematic structural diagram of an inspection device for fault detection of a display screen provided by an embodiment of the present disclosure.

Referring to FIG. 2, an inspection device in the embodiment of the present application is illustrated.

The inspection device includes an inspection robot 21, a frame 22, a light-shading part 23 and image acquisition equipment 24, wherein a bottom of the frame 22 is provided with wheels for controlling the inspection device to move. The image acquisition equipment 24, such as a camera, is located in a space formed by the frame 22 and the light-shading part 23, is arranged on the inspection robot 21, faces one side of a tiled display screen, and is used for photographing the tiled display screen to obtain a display image of any display screen as a to-be-detected image. The inspection robot 21 receives the to-be-detected image from the image acquisition equipment 24 and determines whether the display screen is faulty and a fault type according to the to-be-detected image.

In the inspection device, the light-shading part 23 may create a darkroom to ensure that an external environment for each inspection is the same. Moreover, the introduction of the inspection device reduces a floor area of the display screen.

Next, a fault detection process of the display screen is illustrated.

Figure 3:
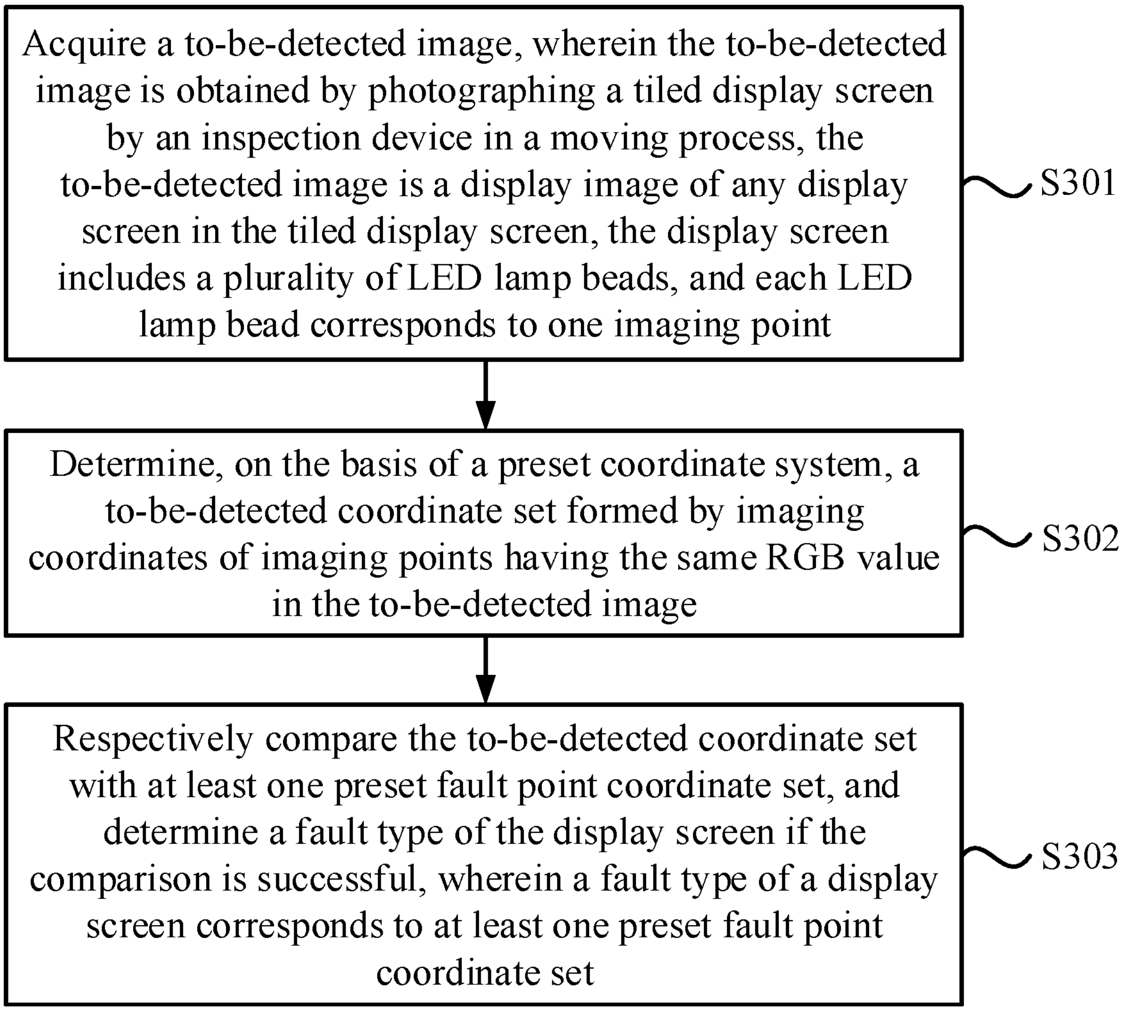
FIG. 3 is a flow diagram of a fault detection method for a display screen provided by an embodiment of the present disclosure.

Referring to FIG. 3, an embodiment of the present disclosure provides a fault detection method for a display screen, including the following steps.

S301, a to-be-detected image is acquired, wherein the to-be-detected image is obtained by photographing a tiled display screen by an inspection device in a moving process, the to-be-detected image is a display image of any display screen in the tiled display screen, the display screen includes a plurality of LED lamp beads, and each LED lamp bead corresponds to one imaging point.

S302, on the basis of a preset coordinate system, a to-be-detected coordinate set formed by imaging coordinates of imaging points having the same RGB value in the to-be-detected image is determined.

S303, the to-be-detected coordinate set is respectively compared with at least one preset fault point coordinate set, and a fault type of the display screen is determined if the comparison is successful, wherein a fault type of a display screen corresponds to at least one preset fault point coordinate set.

In the embodiment of the present application, the to-be-detected image (the display image of any display screen in the tiled display screen) obtained by photographing the tiled display screen by the inspection device in the moving process is acquired, the display screen includes the plurality of LED lamp beads, and each LED lamp bead corresponds to one imaging point. On the basis of the preset coordinate system, the to-be-detected coordinate set formed by the imaging coordinates of the imaging points having the same RGB value in the to-be-detected image is determined. It can be known in combination with circuit characteristics of the display screen that the fault type of the display screen corresponds to the at least one preset fault point coordinate set, and the coordinates in the preset fault point coordinate set represent a location relationship between fault points under the corresponding fault type. Therefore, the to-be-detected coordinate set is respectively compared with the at least one preset fault point coordinate set, and the fault type of the display screen is determined if the comparison is successful. Compared with manual inspection, automatic detection of the display screen is achieved, and detection efficiency and accuracy are improved.

When it comes to S301, a large ground display LED usually includes thousands of LED screens, each LED screen is called a display screen, and the plurality of display screen are tiled to the large ground display LED. By adjusting an installation location and a photographing angle of a camera in the inspection device, a photographing range is made to be a size of one display screen. However, in an actual photographing process, the obtained displayed image may be a part of one display screen, and such displayed image is discarded. The obtained display image may be an image presented by more than one display screen, and at this time, a to-be-detected image of one display screen may be obtained by image cropping. If the obtained display image happens to be one display screen, it may be directly used as the to-be-detected image. Therefore, the to-be-detected image is the display image of any display screen.

In addition, there is no restriction on playback materials of the display screen in the photographing process. It may be that the display screen is in use, such as during program rehearsal, and the playback materials may be program materials in a rehearsal process.

When it comes to S302, taking one display screen as an example, the display screen includes the plurality of LED lamp beads, such as 960*960 LED lamp beads. In the obtained to-be-detected image, each LED lamp bead corresponds to one imaging point. Therefore, after obtaining the to-be-detected image, the RGB value of each imaging point in the to-be-detected image, as well as the imaging coordinates of each imaging point, may be obtained.

Exemplarily, the preset coordinate system is pre-established or pre-stored, wherein an origin of the preset coordinate system is a vertex in an upper left corner of the display screen, an abscissa represents the number of rows of the imaging points, an ordinate represents the number of columns of the imaging points, a horizontal-axis direction is downward from the origin, and a vertical-axis direction is rightward from the origin. Taking 960*960 LED lamp beads as an example, coordinates of the imaging point in a first row and a first column are (1,1), coordinates of the imaging point in a second row and a third column are (2,3), and coordinates of the imaging point in a $960^{th}$ row and a $960^{th}$ column are (960,960).

If there is no fault on the display screen, the RGB values of the imaging points are RGB values corresponding to colors of the display materials themselves. However, when the display screen is faulty, the plurality of imaging points having the same RGB value in a certain pattern may appear. Therefore, the imaging points having the same RGB value in the to-be-detected image are screened out, and a set formed by their coordinates is the to-be-detected coordinate set.

When it comes to S303, because there are usually several fault types of the display screen and each fault type of the display screen corresponds to the at least one preset fault point coordinate set, coordinates of fault points corresponding to the corresponding fault type are stored in the preset fault point coordinate set, and a location relationship between all the fault points may be obtained according to the preset fault point coordinate set.

The to-be-detected coordinate set is respectively compared with the at least one preset fault point coordinate set, and the fault type of the display screen may be determined when the comparison is successful.

Next, the different fault types and their respective determination processes are illustrated.

Fault Type 1: A Signal Loss Fault.

Figure 4:
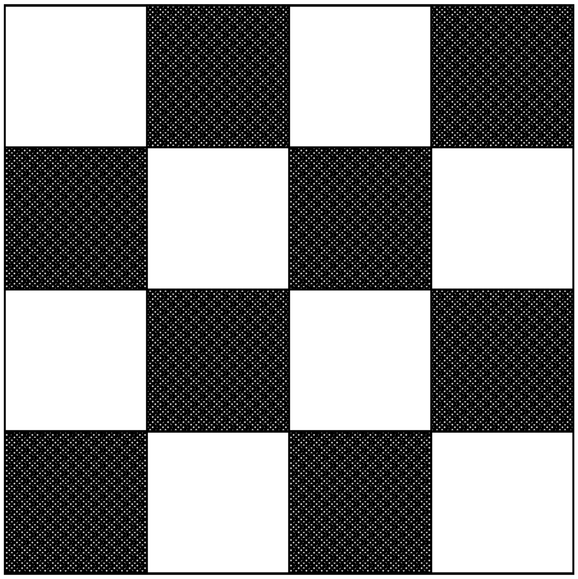
FIG. 4 is a schematic diagram of an imaging point for a signal loss fault provided by an embodiment of the present disclosure.
Figure 5:
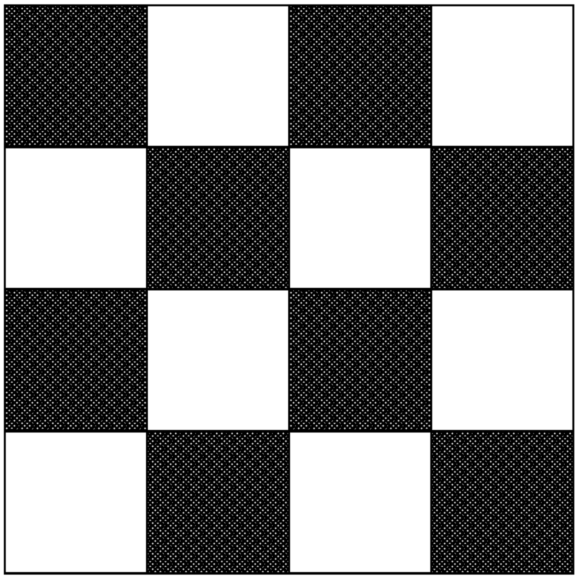
FIG. 5 is a schematic diagram of an imaging point for another signal loss fault provided by an embodiment of the present disclosure.

As shown in FIG. 4, each square represents the imaging point of one LED lamp bead. In a case that the display screen is not faulty, an RGB value of the imaging point corresponding to each lamp bead is an original RGB value of the to-be-detected image. However, due to the fact that a system of the display screen is a dual backup system, when a signal is lost, the LED in the location relationship shown in FIG. 4 will present the same color, while the other LED lamp beads will display their original colors. Taking an example that one display screen has 960*960 lamp beads, for convenience, only 4*4 lamp beads are shown in FIG. 4 and FIG. 5, and a display pattern of other lamp beads is the same as that of the shown lamp beads. In the example shown in FIG. 4, a signal A is lost, and correspondingly, in the example shown in FIG. 5, a signal B is lost.

It should be noted that in FIG. 4 and FIG. 5, white imaging points are non-faulty imaging points, displaying the original colors of the display materials, and white is only used for illustration. Black imaging points are faulty imaging points, displaying the same color (not necessarily black, black is also only used for illustration). However, the specific color type is not necessarily related to the fault type, and it can be known on the basis of chip characteristics of a displayer that the colors of the black imaging points are the same. For example, all the black imaging points in FIG. 4 are purple.

Fault Type 2: At Least One LED Controller is Faulty.

Figure 6:
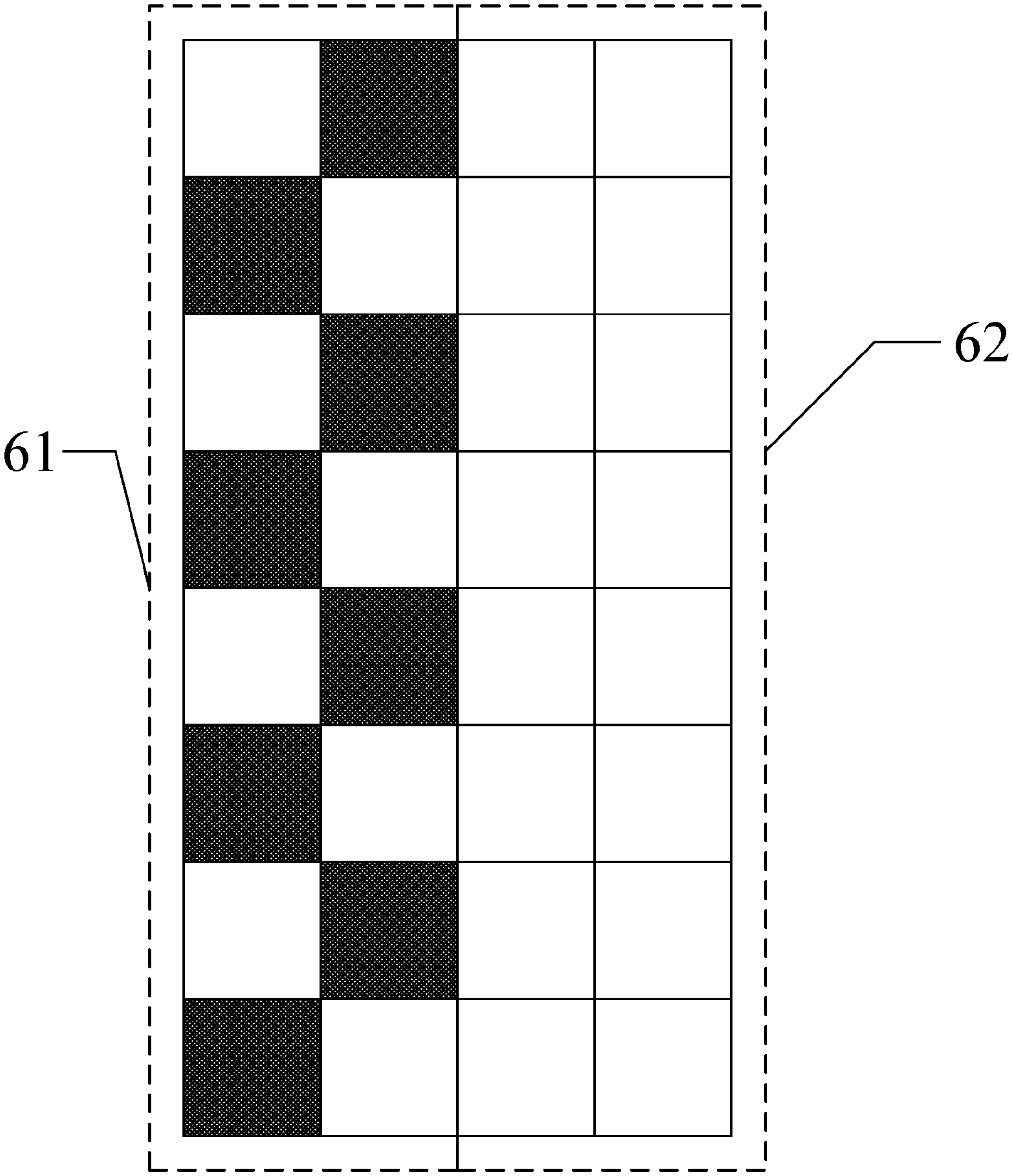
FIG. 6 is a schematic diagram of an imaging point for an LED controller fault provided by an embodiment of the present disclosure.
Figure 7:
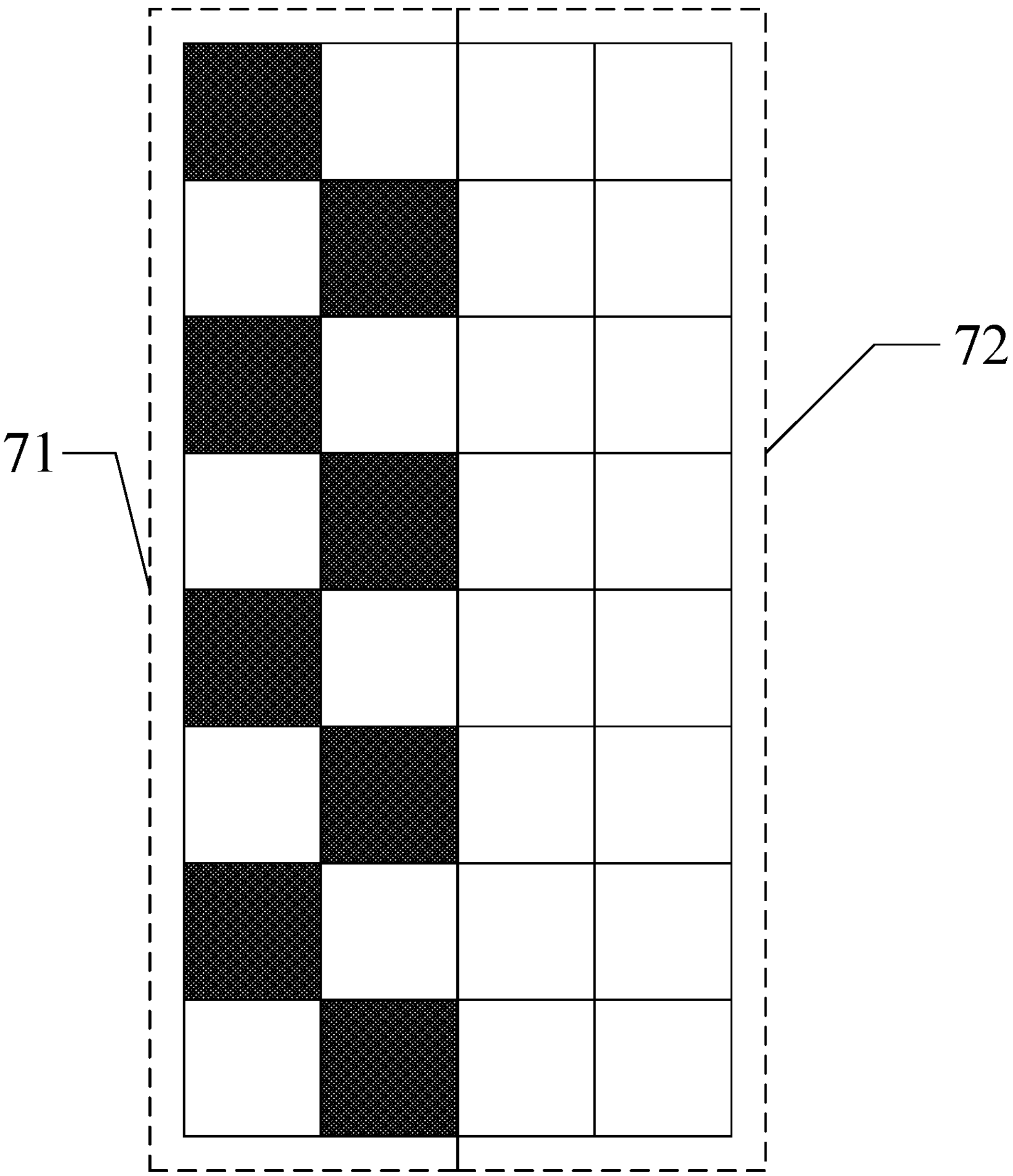
FIG. 7 is a schematic diagram of an imaging point for another LED controller fault provided by an embodiment of the present disclosure.

Referring to FIG. 6, it can be known according to the design of an LED circuit and characteristics of the LED controller that the quantity of LED lamp beads controlled to display by one LED controller is related to the type of the LED controller. When one LED controller is faulty, the display of the LED lamp beads controlled by it will show corresponding features. Taking a type of LED controllers as an example, referring to FIG. 6, the controller fault may cause the 8 fault points shown in FIG. 6 (indicated in black in FIG. 6). For example, 61 is an imaging point of the LED lamp beads controlled by an LED controller 1, and 62 is an imaging point of the LED lamp beads controlled by an LED controller 2. For another type of LED controllers, referring to FIG. 7, the controller fault may cause the 8 fault points shown in FIG. 7, 71 is an imaging point of the LED lamp beads controlled by an LED controller 3, and 72 is an imaging point of the LED lamp beads controlled by an LED controller 4. The meanings of the black imaging points and the white imaging points in FIG. 6 and FIG. 7 are the same as those in FIG. 4 and FIG. 5, and will not be repeated here.

A process of determining the fault type 1 in the first case:

the preset fault point coordinate set includes a first fault point coordinate set, and at this time, the to-be-detected coordinate set is compared with the first fault point coordinate set; and if coordinates in the to-be-detected coordinate set are respectively equal to coordinates in the first fault point coordinate set, it is determined that the comparison is successful, and that the fault type of the display screen is a signal loss fault or an all-LED controller fault.

For example, the first fault coordinate set stores the coordinates of each fault point corresponding to a location pattern of the fault type 1. However, it can be known from the actual situation that when all LED controllers are faulty, the display situation of each LED lamp bead may be the same as the display situation of one signal loss. In this case, the fault type needs to be further confirmed manually.

In this case, the first fault point coordinate set is obtained by performing the following operations based on the coordinates of each imaging point on the display screen:

increasing, starting from a first preset imaging point in a first row, an ordinate in sequence according to a set step length, so as to form a first coordinate set by the obtained coordinates of each imaging point; increasing, starting from a second preset imaging point in a second row, an abscissa in sequence according to the set step length, so as to form a second coordinate set by the obtained coordinates of each imaging point; increasing, for each imaging point in the first coordinate set, the ordinate according to the set step length in sequence, so as to form a third coordinate set by the obtained coordinates of each imaging point; increasing, for each imaging point in the first coordinate set, the ordinate according to the set step length in sequence, so as to form a fourth coordinate set by the obtained coordinates of each imaging point; determining that the first coordinate set, the second coordinate set, the third coordinate set and the fourth coordinate set form the first preset fault point coordinate set, wherein if the first preset imaging point is a second imaging point in the first row, then the second preset imaging point is a first imaging point in the second row; and if the first preset imaging point is a first imaging point in the first row, then the second preset imaging point is a second imaging point in the second row.

Exemplarily, due to the fact that the system of the display screen is the dual backup system, the coordinates in the coordinate set of the corresponding first fault point are different when the signal A is lost and the signal B is lost.

When the signal A is lost, the first preset imaging point in the first row is the second imaging point in the first row, with the coordinates (1,2). Among the 960*960 imaging points, the ordinate is increased in sequence according to the set step length (such as 2) to obtain (1,4), (1,6), . . . , (1,958), and (1,960). The coordinates of these points form the first coordinate set, and these points are all the imaging points in the first row.

The second preset imaging point in the second row is the first imaging point in the second row, with the coordinates (2,1). Among the 960*960 imaging points, the ordinate is increased in sequence according to the set step length (such as 2) to obtain (2,3), (2,5), . . . , (2, 957), and (2,959). The coordinates of these points form the second coordinate set, and these points are all the imaging points in the second row.

For each imaging point in the first coordinate set, the abscissa is increased in sequence according to the set step length. For example, for (1,2), the abscissa is increased in sequence to obtain (3,2), (5,2), . . . (957,2), and (959,2). In this way, the same operation is performed on each point in the first coordinate set to obtain the third coordinate set, and the points in the third coordinate set are the imaging points in a $2^{nd}$ column, a $4^{th}$ column, . . . , a $958^{th}$ column, and a $960^{th}$ column.

For each imaging point in the second coordinate set, the abscissa is increased in sequence according to the set step length. For example, for (2,1), the abscissa is increased in sequence to obtain (4,1), (6,1), . . . (958,1), and (960,1). In this way, the same operation is performed on each point in the second coordinate set to obtain the fourth coordinate set, and the points in the fourth coordinate set are the imaging points in a $1^{st}$ column, a $3^{rd}$ column, . . . , a $957^{th}$ column, and a $959^{th}$ column.

As above, it is determined that the first coordinate set, the second coordinate set, the third coordinate set and the fourth coordinate set form the first preset fault point coordinate set.

The above example is based on the situation where the signal A is lost. When the signal B is lost, the first preset imaging point is the first imaging point in the first row, and the second preset imaging point is the second imaging point in the second row. The other steps are the same and will not be repeated here.

A process of determining the fault type 2 in the second case:

the preset fault point coordinate set includes a second preset fault point coordinate set, at this time, the to-be-detected coordinate set is respectively compared with each second fault point coordinate subset, and if the comparison is successful, an LED control chip fault corresponding to the second fault point coordinate subset with the successful comparison is determined.

Exemplarily, if an LED control chip controls 16 LEDs with a specific arrangement, a 960*960 display screen consists of 57600 LED control chips, and the coordinates of the fault points corresponding to each LED control chip form one subset.

In this case, each second preset fault point coordinate subset is obtained by performing the following operations based on the coordinates of each imaging point on the display screen:

determining a third preset imaging point among imaging points controlled by the same LED control chip; increasing, based on the preset coordinate system and starting from the third preset imaging point, an abscissa in sequence according to a set step length, so as to obtain a first group of imaging points with the preset quantity, wherein, the preset quantity is determined according to a type of the LED control chip; determining an imaging point at a preset location relationship of the third preset imaging point as a fourth preset imaging point, and increasing, starting from the fourth preset imaging point, the abscissa in sequence according to the set step length, so as to obtain a second group of imaging points with the preset quantity; and determining that coordinates of the first group of imaging points with the preset quantity and coordinates of the second group of imaging points with the preset quantity form the second fault point coordinate subset.

In combination with FIG. 6, the imaging points of the same LED control chip are an 8*2 imaging point group. Starting from the first group of imaging points in the upper left corner of the display screen, the coordinates of the third preset imaging point, such as the second imaging point in the first row, are (1,2). The abscissa is increased in sequence according to the set step length (such as 2) to obtain (3,2), (5,2), and (7,2). In this example, the first preset quantity is 4, and the preset location relationship is diagonally opposite to a lower left corner. That is to say, the coordinates of the fourth preset imaging point are (2,1), and then the abscissa is increased in sequence according to the set step length (such as 2) to obtain (4,1), (6,1), and (8,1). In this way, the points included in the second fault point coordinate subset in this example are (1,2), (3,2), (5,2), (7,2), (2,1), (4,1), (6,1), and (8,1).

As mentioned above, the signal loss fault and the LED control chip fault are illustrated. Although the two faults above are the most common faults leading to display screen faults, other faults may also occur in practical applications.

Considering that the fault type may further be a fault of the LED lamp bead itself, such as being caused by excessive pressure, if the to-be-detected coordinate set is not successfully compared with each preset fault point coordinate set, and when it is determined that it is not the signal fault or the LED control chip fault, the fault of the LED lamp bead itself is detected.

In a large ground display system, in order to improve a display effect, the plurality of imaging points are usually used to form one image pixel. The quantity of the imaging points that form one image pixel is represented by a second preset quantity, which is determined by design principles of a loop signal and a backup signal of the display screen. Exemplarily, the second preset quantity may be 4, and the 4 pixels form a square matrix arrangement. In a case that the display screen is not faulty, the RGB of one image pixel is the same and is the color of the image itself. Therefore, for any group of four imaging points that form one image pixel, whether RGB values of the second preset quantity are the same is judged. If at least one imaging point has a different RGB value from the other imaging points, the LED lamp bead fault corresponding to the different imaging points is determined.

Figure 8:
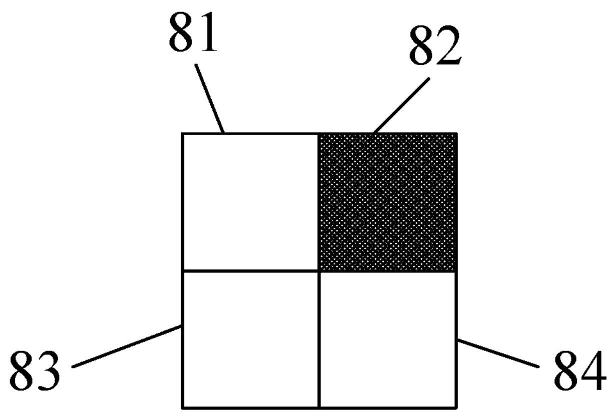
FIG. 8 is a schematic diagram of an imaging point for an LED lamp bead fault provided by an embodiment of the present disclosure.

In a specific example, FIG. 8 shows a situation of an LED lamp bead fault. In this example, if the color of an imaging point 82 is different from the colors of imaging points 81, 83, and 84, it is determined that the LED lamp bead of the imaging point 82 is faulty. The meanings of the black imaging points and the white imaging points in FIG. 8 are the same as those in FIG. 4 and FIG. 5, and will not be repeated here.

In addition, when it is not any one of the signal fault, the LED control chip fault, or the LED lamp bead fault, the to-be-detected image may be sent to a server, the server pre-stores display pictures corresponding to a current moment of each display screen, the server determines the display picture, that is, a standard image, corresponding to the to-be-detected display screen according to the location of the inspection device at the current moment. The to-be-detected image is compared with the standard image to determine whether the display screen is faulty and the fault type. An image processing algorithm may be used specifically, which is not limited here.

In a process of determining the fault type of the display screen, the coordinates of each fault point may be obtained. Therefore, while determining the fault type, the location of each fault point in the display screen may further be determined. In addition, location information of the faulty display screen in the tiled display screen is determined according to a current location of the inspection device; the location information is sent to the server and/or a mobile terminal bound to the inspection device, so that operation and maintenance personnel can accurately find the faulty display screen for repair according to the location information, and also timely know the location of the fault point in the display screen.

In the embodiment of the present application, there is no restriction on the materials played on the display screen, that is, during the use of the display screen, such as during actor rehearsal, synchronous inspection may also be performed, and inspection may be performed under dynamic materials, which can also improve robustness. In order to improve inspection efficiency, path planning may be performed on the inspection device. In this way, when moved outside a site and then returning to the site, the inspection device may continue to inspect according to a recorded historical location. A positioning function of the inspection device may be determined by acquiring location information of each display screen in the site in real time through a positioning device. The inspection device may further report its own location to the server in real time and receive a real-time path issued by the server. As mentioned above, replacing manual inspection with the inspection device not only improves an automation level of inspection, but also improves the detection accuracy and efficiency.

Figure 9:
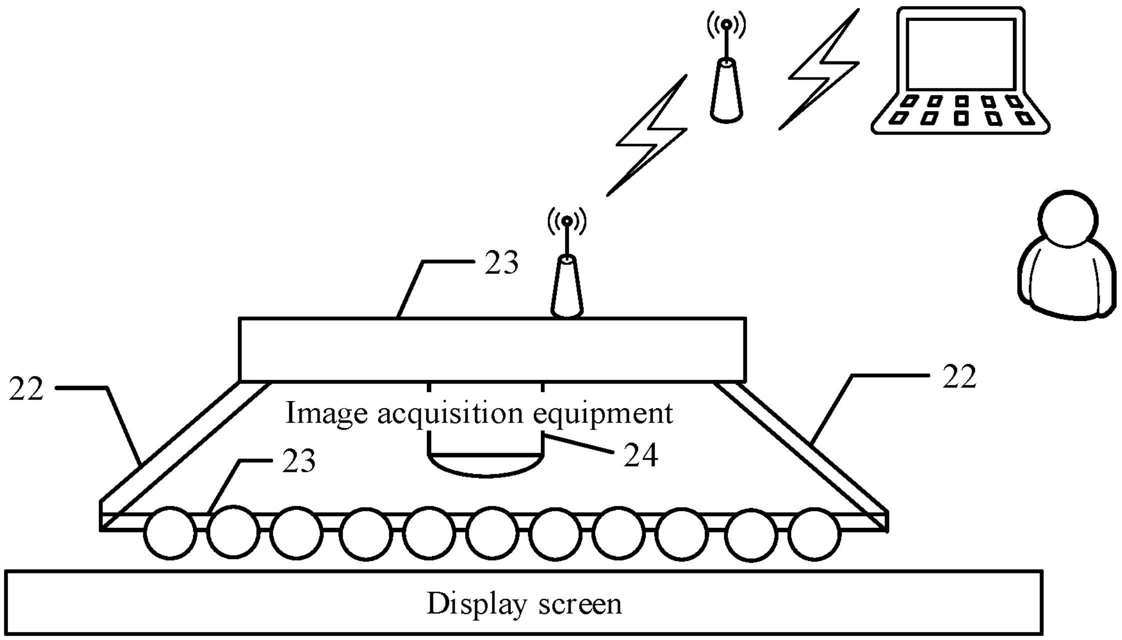
FIG. 9 is a working principle diagram of another inspection device provided by an embodiment of the present disclosure.

In addition, referring to FIG. 9, it is possible to manually control the movement of the inspection device by solely utilizing its movement and photographing functions. In FIG. 9, the inspection device does not perform data processing, and the images photographed by image acquiring equipment are transmitted to terminal equipment through a network for remote inspection by the staff. This mode allows for manual control of an inspection route, making it convenient and flexible.

Figure 10:
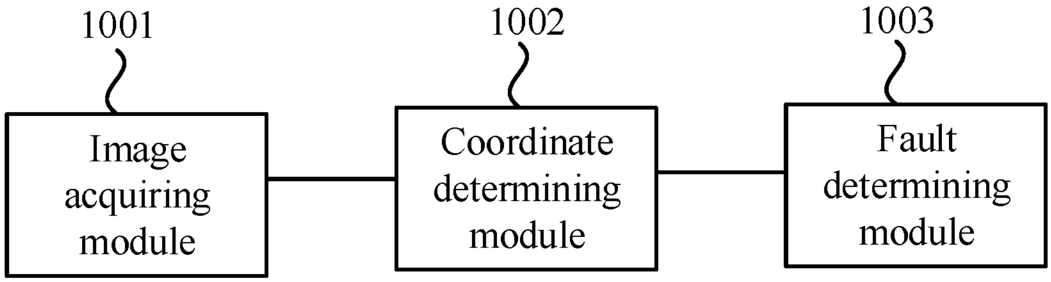
FIG. 10 is a schematic structural diagram of a fault detection device for a display screen provided by an embodiment of the present disclosure.

As shown in FIG. 10, based on the same invention concept as the fault detection method for the display screen above, an embodiment of the present disclosure further provides a fault detection device for a display screen, which at least includes an image acquiring module 1001, a coordinate determining module 1002, and a fault determining module 1003.

The image acquiring module 1001 is configured to acquire a to-be-detected image, wherein the to-be-detected image is obtained by photographing a tiled display screen by an inspection device in a moving process, the to-be-detected image is a display image of any display screen in the tiled display screen, the display screen includes a plurality of LED lamp beads, and each LED lamp bead corresponds to one imaging point.

The coordinate determining module 1002 is configured to determine, on the basis of a preset coordinate system, a to-be-detected coordinate set formed by imaging coordinates of imaging points having the same RGB value in the to-be-detected image.

The fault determining module 1003 is configured to respectively compare the to-be-detected coordinate set with at least one preset fault point coordinate set, and determine a fault type of the display screen if the comparison is successful, wherein a fault type of a display screen corresponds to at least one preset fault point coordinate set.

In some exemplary implementations, the preset fault point coordinate set includes a first fault point coordinate set, and the fault determining module 1003 is specifically configured to:

compare the to-be-detected coordinate set with the first fault point coordinate set; and determine, if coordinates in the to-be-detected coordinate set are respectively equal to coordinates in the first fault point coordinate set, that the comparison is successful, and determine that the fault type of the display screen is a signal loss fault or an all-LED controller fault.

In some exemplary implementations, the coordinate determining module is further included for determining the first fault point coordinate set by performing the following operations based on the coordinates of each imaging point on the display screen:

increasing, based on the preset coordinate system and starting from a first preset imaging point in a first row, an ordinate in sequence according to a set step length, so as to form a first coordinate set by the obtained coordinates of each imaging point, wherein an origin of the preset coordinate system is a vertex in an upper left corner of the display screen, an abscissa represents the number of rows of the imaging points, the ordinate represents the number of columns of the imaging points, a horizontal-axis direction is downward from the origin, and a vertical-axis direction is rightward from the origin;

increasing, starting from a second preset imaging point in a second row, the ordinate in sequence according to the set step length, so as to form a second coordinate set by the obtained coordinates of each imaging point;

increasing, for each imaging point in the first coordinate set, the abscissa according to the set step length in sequence, so as to form a third coordinate set by the obtained coordinates of each imaging point;

increasing, for each imaging point in the first coordinate set, the abscissa according to the set step length in sequence, so as to form a fourth coordinate set by the obtained coordinates of each imaging point; and determining that the first coordinate set, the second coordinate set, the third coordinate set and the fourth coordinate set form the first preset fault point coordinate set, wherein if the first preset imaging point is a second imaging point in the first row, then the second preset imaging point is a first imaging point in the second row; and if the first preset imaging point is a first imaging point in the first row, then the second preset imaging point is a second imaging point in the second row.

In some exemplary implementations, the preset fault point coordinate set includes a second preset fault point coordinate set, and the second preset fault point coordinate set includes at least one second preset fault point coordinate subset; and the fault determining module 1003 is specifically configured to:

respectively compare the to-be-detected coordinate set with each second fault point coordinate subset, and determine, if the comparison is successful, an LED control chip fault corresponding to the second preset fault point coordinate subset with the successful comparison.

In some exemplary implementations, the coordinate determining module is configured to determine the second fault point coordinate subset by performing the following operations based on the coordinates of each imaging point on the display screen:

determining a third preset imaging point among imaging points controlled by the same LED control chip;

increasing, based on the preset coordinate system and starting from the third preset imaging point, an abscissa in sequence according to a set step length, so as to obtain a first group of imaging points with the preset quantity, wherein, the preset quantity is determined according to a type of the LED control chip, wherein, an origin of the preset coordinate system is a vertex in an upper left corner of the display screen, the abscissa represents the number of rows of the imaging points, an ordinate represents the number of columns of the imaging points, a horizontal-axis direction is downward from the origin, and a vertical-axis direction is rightward from the origin;

determining an imaging point at a preset location relationship of the third preset imaging point as a fourth preset imaging point, and increasing, starting from the fourth preset imaging point, the abscissa in sequence according to the set step length, so as to obtain a second group of imaging points with the preset quantity; and determining that coordinates of the first group of imaging points with the preset quantity and coordinates of the second group of imaging points with the preset quantity form the second fault point coordinate subset.

In some exemplary implementations, the fault determining module 1003 is further configured to:

judge, if the to-be-detected coordinate set is not successfully compared with each preset fault point coordinate set, whether RGB values of the second preset quantity are the same for any group of second preset quantity of imaging points that form one image pixel; and determine, if not, LED lamp bead faults corresponding to different imaging points.

In some exemplary implementations, the fault determining module 1003 is further configured to:

send the to-be-detected image to a server if the to-be-detected coordinate set is not successfully compared with each preset fault point coordinate set and there is no LED lamp bead fault, such that the server determines a standard image corresponding to the to-be-detected image in a pre-stored image set, and compares the to-be-detected image with the standard image to determine whether the display screen is faulty and the fault type.

In some exemplary implementations, a location information sending module is further included and configured to, after determining the fault type of the display screen:

determine location information of a faulty display screen in the tiled display screen according to a current location of the inspection device; and send the location information to the server and/or a mobile terminal bound to the inspection device.

The fault detection device for the display screen provided by the embodiment of the present disclosure adopts the same invention concept as the fault detection method for the display screen above, which can achieve the same beneficial effects, and will not be repeated here.

Figure 11:
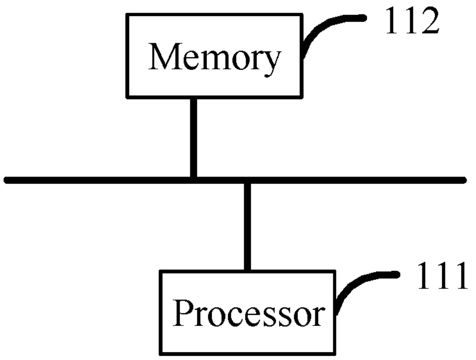
FIG. 11 is a schematic structural diagram of an inspection robot provided by an embodiment of the present disclosure.

Based on the same invention concept as the fault detection method for the display screen above, an embodiment of the present disclosure further provides an inspection robot, and the inspection robot may specifically be a desktop computer, a portable computer, a smart phone, a tablet computer, a personal digital assistant (PDA), a server and the like. As shown in FIG. 11, the inspection robot may include a processor 111 and a memory 112.

The processor 111 may be a general-purpose processor, such as a central processing unit (CPU), a digital signal processor (DSP), an application specific integrated circuit (ASIC), a field-programmable gate array (FPGA) or other programmable logic devices, a discrete gate or a transistor logic device, or a discrete hardware component, which can implement or execute all the methods, steps and logic block diagrams disclosed in the embodiment of the present disclosure. The general-purpose processor may be a microprocessor or any conventional processor, etc. The steps of the method disclosed in combination with the embodiment of the present disclosure may be directly embodied as being executed and completed by a hardware processor, or be executed and completed by a hardware and software module combination in the processor.

As a non-transitory computer readable storage medium, the memory 112 may be configured to store non-transitory software programs, non-transitory computer executable programs and modules. The memory may include at least one type of storage medium, such as a flash memory, a hard disk, a multimedia card, a card type memory, a random access memory (RAM), a static random access memory (SRAM), a programmable read only memory (PROM), a read only memory (ROM), an electrically erasable programmable read-only memory (EEPROM), a magnetic memory, a magnetic disk, an optical disc, and so on. The memory is any other medium that can be configured to carry or store a desired program code in a form of instructions or data structures and can be accessed by a computer, but is not limited to this. The memory 112 in the embodiment of the present disclosure may further be a circuit or any other devices capable of implementing a storage function, and is configured to store program instructions and/or data.

Those ordinarily skilled in the art may understand that all or part of the steps to implement the above method embodiments may be completed through hardware related to the program instructions. The aforementioned program may be stored in a computer readable storage medium, and the program, when executed, executes the steps including the above method embodiments. The above computer storage medium may be any available medium or data storage equipment that a computer can access, including but not limited to: mobile storage equipment, a random access memory (RAM), a magnetic memory (such as a floppy disk, a hard drive, a magnetic tape, and a magneto-optical disk (MO)), an optical memory (such as a CD, a DVD, a BD, and an HVD), and various media that can store the program code, such as a semiconductor memory (such as an ROM, an EPROM, an EEPROM, a nonvolatile memory (NAND FLASH), and a solid-state drive (SSD)).

Alternatively, the integrated unit above in the present disclosure, if implemented in the form of a software functional module and sold or used as an independent product, may also be stored in a computer readable storage medium. Based on such understanding, the technical solutions of the embodiments of the present disclosure essentially, or parts contributing to the prior art, can be embodied in a software product form. A computer software product is stored in a storage medium, including a plurality of instructions used to cause computer equipment (may be a personal computer, a server, network equipment, etc.) to execute all or part of the methods in all the embodiments of the present disclosure. The aforementioned storage medium includes: mobile storage equipment, a random access memory (RAM), a magnetic memory (such as a floppy disk, a hard drive, a magnetic tape, and a magneto-optical disk (MO)), an optical memory (such as a CD, a DVD, a BD, and an HVD), and various media that can store the program code, such as a semiconductor memory (such as an ROM, an EPROM, an EEPROM, a nonvolatile memory (NAND FLASH), and a solid-state drive (SSD)).

The above embodiments are only used to provide a detailed introduction to the technical solutions of the present disclosure, but the illustration of the above embodiments is only for the purpose of helping to understand the methods of the embodiments of the present disclosure and should not be understood as limitations on the embodiments of the present disclosure. Any changes or replacements that those skilled in the art can easily think of should be covered within the scope of protection of the embodiments of the present disclosure.

What is claimed is:

1. A fault detection method for a display screen, comprising:

acquiring a to-be-detected image, wherein the to-be-detected image is obtained by photographing a tiled display screen by an inspection device in a moving process, the to-be-detected image is a display image of any display screen in the tiled display screen, the display screen comprises a plurality of LED lamp beads, and each LED lamp bead corresponds to one imaging point;

determining, on the basis of a preset coordinate system, a to-be-detected coordinate set formed by imaging coordinates of imaging points having a same RGB value in the to-be-detected image; and respectively comparing the to-be-detected coordinate set with at least one preset fault point coordinate set, and determining a fault type of the display screen in response to the comparison being successful, wherein a fault type of a display screen corresponds to at least one preset fault point coordinate set;

wherein the preset fault point coordinate set comprises a first fault point coordinate set, and respectively comparing the to-be-detected coordinate set with each preset fault point coordinate set, and determining the fault type of the display screen in response to the comparison being successful comprise:

comparing the to-be-detected coordinate set with the first fault point coordinate set; and determining, in response to coordinates in the to-be-detected coordinate set being respectively equal to coordinates in the first fault point coordinate set, that the comparison is successful, and determining that the fault type of the display screen is a signal loss fault or an all-LED controller fault;

wherein the first fault point coordinate set is obtained by performing the following operations based on the coordinates of each imaging point on the display screen:

increasing, based on the preset coordinate system and starting from a first preset imaging point in a first row, an ordinate in sequence according to a set step length, to form a first coordinate set by the obtained coordinates of each imaging point, wherein an origin of the preset coordinate system is a vertex in an upper left corner of the display screen, an abscissa represents the number of rows of the imaging points, the ordinate represents the number of columns of the imaging points, a horizontal-axis direction is downward from the origin, and a vertical-axis direction is rightward from the origin;

increasing, starting from a second preset imaging point in a second row, the ordinate in sequence according to the set step length, to form a second coordinate set by the obtained coordinates of each imaging point;

increasing, for each imaging point in the first coordinate set, the abscissa according to the set step length in sequence, to form a third coordinate set by the obtained coordinates of each imaging point;

increasing, for each imaging point in the first coordinate set, the abscissa according to the set step length in sequence, to form a fourth coordinate set by the obtained coordinates of each imaging point; and determining that the first coordinate set, the second coordinate set, the third coordinate set and the fourth coordinate set form the first preset fault point coordinate set, wherein in response to the first preset imaging point being a second imaging point in the first row, the second preset imaging point is a first imaging point in the second row; and in response to the first preset imaging point being a first imaging point in the first row, the second preset imaging point is a second imaging point in the second row.

2. The method according to claim 1, further comprising:

judging, in response to the to-be-detected coordinate set being not successfully compared with each preset fault point coordinate set, whether RGB values of a second preset quantity are the same for any group of imaging points with the second preset quantity that form one image pixel; and determining, if not, LED lamp bead faults corresponding to different imaging points.

3. The method according to claim 2, further comprising:

sending the to-be-detected image to a server in response to the to-be-detected coordinate set being not successfully compared with each preset fault point coordinate set and there is no LED lamp bead fault, such that the server determines a standard image corresponding to the to-be-detected image in a pre-stored image set, and compares the to-be-detected image with the standard image to determine whether the display screen is faulty and the fault type.

4. The method according to claim 1, wherein after determining the fault type of the display screen, the method further comprises:

determining location information of a faulty display screen in the tiled display screen according to a current location of the inspection device; and sending the location information to the server and/or a mobile terminal bound to the inspection device.

5. An inspection robot, comprising a memory, a processor, and computer programs stored on the memory and capable of being run on the processor, wherein the processor, when executing the computer programs, implements steps of the method according to claim 1.

6. A non-transitory computer readable storage medium, storing computer program instructions thereon, wherein the computer program instructions, when executed by a processor, implements steps of the method according to claim 1.

7. A fault detection method for a display screen, comprising:

acquiring a to-be-detected image, wherein the to-be-detected image is obtained by photographing a tiled display screen by an inspection device in a moving process, the to-be-detected image is a display image of any display screen in the tiled display screen, the display screen comprises a plurality of LED lamp beads, and each LED lamp bead corresponds to one imaging point;

determining, on the basis of a preset coordinate system, a to-be-detected coordinate set formed by imaging coordinates of imaging points having a same RGB value in the to-be-detected image; and respectively comparing the to-be-detected coordinate set with at least one preset fault point coordinate set, and determining a fault type of the display screen in response to the comparison being successful, wherein a fault type of a display screen corresponds to at least one preset fault point coordinate set;

wherein the preset fault point coordinate set comprises a second preset fault point coordinate set, and the second preset fault point coordinate set comprises at least one second preset fault point coordinate subset; and respectively comparing the to-be-detected coordinate set with each preset fault point coordinate set, and determining the fault type of the display screen in response to the comparison being successful comprise:

respectively comparing the to-be-detected coordinate set with each second fault point coordinate subset, and determining, in response to the comparison being successful, an LED control chip fault corresponding to the second preset fault point coordinate subset with the successful comparison;

wherein each second preset fault point coordinate subset is obtained by performing the following operations based on the coordinates of each imaging point on the display screen:

determining a third preset imaging point among imaging points controlled by a same LED control chip;

increasing, based on the preset coordinate system and starting from the third preset imaging point, an abscissa in sequence according to a set step length, to obtain a first group of imaging points with a preset quantity, wherein, the preset quantity is determined according to a type of the LED control chip, wherein, an origin of the preset coordinate system is a vertex in an upper left corner of the display screen, the abscissa represents the number of rows of the imaging points, an ordinate represents the number of columns of the imaging points, a horizontal-axis direction is downward from the origin, and a vertical-axis direction is rightward from the origin;

determining an imaging point at a preset location relationship of the third preset imaging point as a fourth preset imaging point, and increasing, starting from the fourth preset imaging point, the abscissa in sequence according to the set step length, to obtain a second group of imaging points with the preset quantity; and determining that coordinates of the first group of imaging points with the preset quantity and coordinates of the second group of imaging points with the preset quantity form the second fault point coordinate subset.

8. The method according to claim 7, further comprising:

judging, in response to the to-be-detected coordinate set being not successfully compared with each preset fault point coordinate set, whether RGB values of a second preset quantity are the same for any group of imaging points with the second preset quantity that form one image pixel; and determining, if not, LED lamp bead faults corresponding to different imaging points.

9. The method according to claim 8, further comprising:

sending the to-be-detected image to a server in response to the to-be-detected coordinate set being not successfully compared with each preset fault point coordinate set and there is no LED lamp bead fault, such that the server determines a standard image corresponding to the to-be-detected image in a pre-stored image set, and compares the to-be-detected image with the standard image to determine whether the display screen is faulty and the fault type.

10. The method according to claim 7, wherein after determining the fault type of the display screen, the method further comprises:

determining location information of a faulty display screen in the tiled display screen according to a current location of the inspection device; and sending the location information to the server and/or a mobile terminal bound to the inspection device.

11. An inspection robot, comprising a memory, a processor, and computer programs stored on the memory and capable of being run on the processor, wherein the processor, when executing the computer programs, implements steps of the method according to claim 7.

12. A non-transitory computer readable storage medium, storing computer program instructions thereon, wherein the computer program instructions, when executed by a processor, implements steps of the method according to claim 7.

* * * * *